(12) United States Patent
Netsell et al.

(10) Patent No.: US 7,787,562 B2
(45) Date of Patent: Aug. 31, 2010

(54) METHOD AND APPARATUS FOR ADAPTIVE MODULATION OF WIRELESS COMMUNICATION SIGNALS

(75) Inventors: Aaron W. Netsell, Woodstock, IL (US); Neil R. Peplinski, North Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 1494 days.

(21) Appl. No.: 11/025,324

(22) Filed: Dec. 29, 2004

(65) Prior Publication Data
US 2006/0140305 A1 Jun. 29, 2006

(51) Int. Cl.
*H04K 1/02* (2006.01)
(52) U.S. Cl. ..................................... 375/296
(58) Field of Classification Search ................ 375/296
See application file for complete search history.

(56) References Cited
U.S. PATENT DOCUMENTS
5,491,832 A * 2/1996 Malkamaki et al. ...... 455/552.1
6,084,919 A * 7/2000 Kleider et al. ............. 375/285
6,307,441 B1 10/2001 Sharpe
6,992,990 B2 * 1/2006 Sakusabe .................... 370/293

FOREIGN PATENT DOCUMENTS
EP 1085668 A2 3/2001
WO WO 03/101062 A1 12/2003

* cited by examiner

*Primary Examiner*—Kevin Y Kim
(74) *Attorney, Agent, or Firm*—Roland K. Bowler, II

(57) ABSTRACT

A block edge detector (310) determines (510) whether a wireless communication transmission with a first modulation having excess spectral emissions will be transmitted at a frequency on a block edge (120). In response, a modulator selector (320) changes (530) the wireless communication transmission to a second modulation with lessened spectral emissions. Preferably, the second modulator (340) is operably coupled to an alternative lookup table (360) wherein phase trajectory entries likely to cause excess spectral emissions such as spurious emissions are smoothed. The entries may be smoothed by filtering, non-linear extrapolation, and/ or linear extrapolation. Alternatively, the second modulator (340) uses an alternative lookup table (360) that is a GMSK modulator with BT less than 0.3.

18 Claims, 4 Drawing Sheets

METHOD AND APPARATUS FOR ADAPTIVE MODULATION OF WIRELESS COMMUNICATION SIGNALS

TECHNICAL FIELD

This invention relates generally to wireless communication systems and more particularly to the modulation of the signals sent by wireless communication devices.

BACKGROUND

Wireless communication systems of various kinds are known in the art. These systems transmit signals at various frequencies or frequency ranges. A frequency range at which a wireless communication device may send a signal may be viewed as a channel. Certain wireless communication systems transmit primarily digital data. To do so, the digital data is usually converted into an analog signal that can be sent by a wireless transceiver. As part of the conversion or modulation, the transmission or signal obtains a particular spectral mask or characteristic response over the channel. The shape of the spectral mask is dependent on several factors including the type of modulation of the signal.

Wireless communication systems typically transmit data over a plurality of channels. To minimize interference between channels, the spectral mask of the transmissions should have spectral emissions, such as spurious emissions, below a certain level. Further, governmental bodies often regulate the frequency spectra available and the use of the frequencies by wireless communication system operators. These regulations may also restrict a transmission's emissions of the spectral mask at a given frequency or channel.

For example, the Federal Communications Commission ("FCC") of the United States by regulation defines six blocks, each 5 MHz wide, of channels for Global System for Mobile communications ("GSM") systems. The FCC regulations also include requirements that spectral emissions not exceed a certain level within a certain frequency range of a block edge. The spectral mask, however, for many wireless communication systems will have emissions that exceed this limitation. Other governmental bodies also impose spectral mask limitations on certain wireless communication transmissions.

BRIEF DESCRIPTION OF THE DRAWINGS

The above needs are at least partially met through provision of the method and apparatus for adaptive modulation of wireless communication signals described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, pursuant to these various embodiments, a block edge detector or other structure determines whether a wireless communication transmission with a modulation having excess spectral emissions will be transmitted at a frequency on a block edge. If the block edge detector determines such an occurrence, a modulator selector will change the wireless communication transmission to a second modulation with lessened spectral emissions.

So configured, a wireless communication device will selectively adjust the modulation of its wireless communication signals or transmissions to avoid excess spectral emissions, such as spurious emissions, on block edges or in general to avoid excess interference with other wireless transmissions. By selectively adjusting the modulation with respect to block edge sensitivity, the wireless communication device may transmit its signals at full power instead of lowering its transmission power to decrease interference or comply with governmental regulations.

Figure 1:
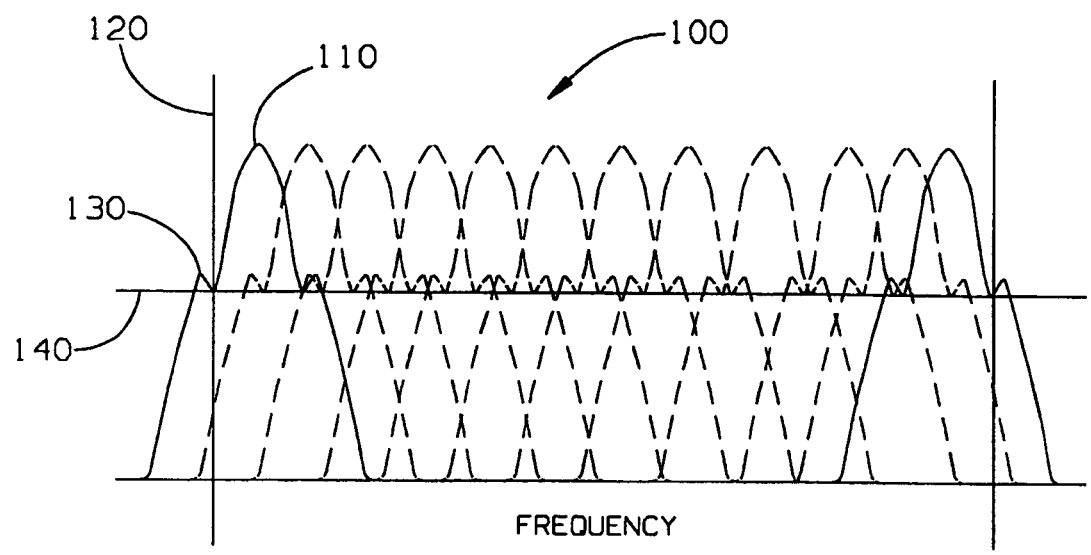
FIG. 1 is a representation of several wireless communication transmissions over a block of channels.

Referring now to the drawings, and in particular to FIG. 1, a series of wireless communication transmissions 100 at a series of channels or frequencies is shown. Each transmission has a substantially similar spectral mask such as that of a sample transmission 110. The sample transmission 110 is made on a channel on a block edge 120. The spectral mask of the transmission 110 includes a spectral emission 130 that exceeds a limit indicated by the line that is denoted by reference numeral 140. This series 100 and the spectral mask for the transmission 110 of FIG. 1 is typical for a GSM system operating with a Gaussian Minimum Shift Keying ("GMSK") modulation BT equaling 0.3, which is a modulation factor known in the art. The limit 140 may be an output power limit for a particular frequency or block edge as set by a regulatory entity or other operational limit.

Figure 2:
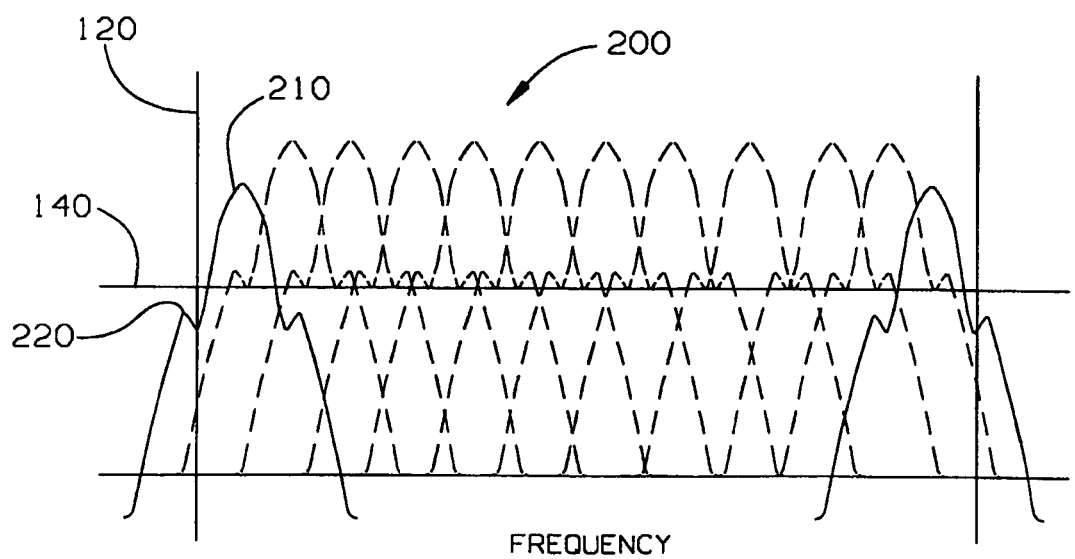
FIG. 2 is a representation of several wireless communication transmissions over a block of channels as configured in accordance with a prior wireless communication system.

The series of transmissions 200 of FIG. 2 illustrate a prior attempt to avoid the limit 140 at a block edge 120. Instead of changing the modulation of the transmission 210 on the block edge 120, the prior system reduced the overall output power of the transmission 200 to reduce the spectral emission 220 below the limit 140. Although this system avoids the limit 140, the transmission 210 will be of a lower quality and have a reduced coverage area as compared to other transmissions of the series 200 because of the reduced transmission power.

Figure 3:
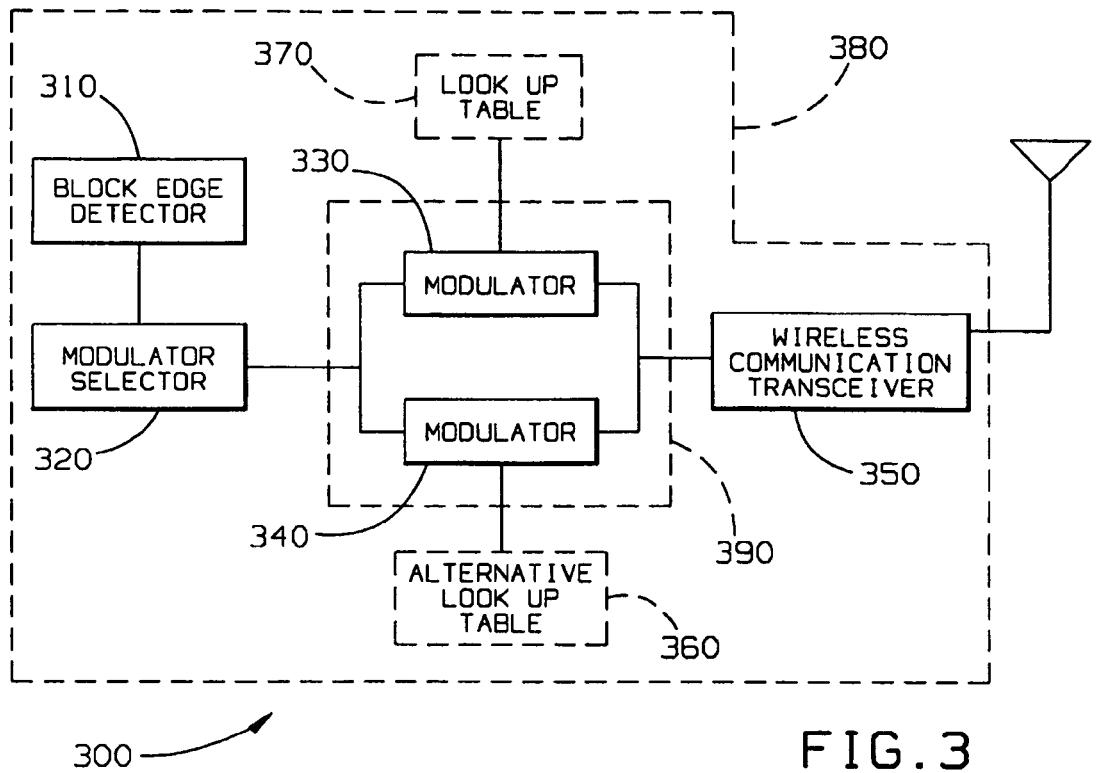
FIG. 3 is a block diagram as configured in accordance with various embodiments of the invention.

Referring to FIG. 3, a wireless communication device 300, according to various embodiments of the invention, includes a block edge detector 310 operably coupled to a modulator selector 320 such that the modulator selector 320 is responsive to the block edge detector 310. The modulator selector 320 is also operably coupled to a first modulator 330 and a second modulator 340. The modulators 330 and 340 are selectively coupled to a wireless communication transceiver 350. Optionally, the second modulator 340 is operably coupled to an alternative lookup table 360, and the first modulator 330 is operably coupled to another lookup table 370. The lookup tables are typically stored in a memory, but may be created dynamically by a processor and software or other enabling structure. Similarly, the block edge detector 310 and modulator selector 320 may be processors with enabling software or other known structure to allow the detection of various conditions or events.

One of skill in the art will recognize that each element of the wireless communication device 300 may comprise separate structures such as electronic circuits and processors. Alternatively, any combination of the elements may be included in one integrated circuit, as indicated by box 380, or in another combination of integrated circuits or other enabling structure. For example, the modulators 330 and 340 may comprise the same structure as indicated at 390.

Preferably, the alternative lookup table 360 includes a table of phase trajectories where lookup table entries likely to cause excess spectral emissions are smoothed to lessen the excess spectral emissions. A lookup table for a modulator such as a GMSK modulator includes the phase trajectories for various changes in signals that are possible when sending a wireless communication transmission. Certain of these phase trajectories, however, cause spectral emissions such as the spurious emissions 130 of the transmission 110 that exceed the limit 140. By selectively modifying these phase trajectory entries in the alternative lookup table 360, spurious emissions of transmissions created by this modulator are lessened such that the transmission power need not be reduced to avoid exceeding the limit 140.

More particularly, the preferred alternative lookup table 360 entries to be modified are those that include the sharpest phase trajectory shifts. The sharpest phase trajectory shifts include, for example, shifting from 0 degrees to 90 degrees and back to 0 degrees. One skilled in the art understands that this and similar phase trajectory entries create a sharp shift that leads to the spurious emissions that typically exceed regulatory or other limits 140. The entries for these sharp phase trajectory shifts are preferably modified by applying a filter to the phase trajectory shift to smooth over the shift, thereby lessening the emissions created when using the alternative lookup table 360 during modulation of the wireless communication transmission. One skilled in the art will understand that various known filters may be applied to modify entries in the alternative lookup table 360.

Alternatively, the alternative lookup table 360 includes a GMSK modulator lookup table where BT is less than 0.3. In this embodiment, the lookup table 370 coupled to a modulator 330 includes a GMSK modulator lookup table where BT is 0.3. Typically, the modulator in GSM systems includes a lookup table with BT equaling 0.3. For example, the European Telecommunications Standards Institute ("ETSI"), the standards body for Europe, recommends that a GMSK modulation filter with BT equaling 0.3 be used with GSM transmitters. Such a modulator, however, has a spectral mask for its transmissions that includes spectral emissions with spurious emissions that may exceed a limit 140 when transmitting on a block edge 120. To avoid the limit 140, the alternative lookup table 360 in this embodiment can be a lookup table with BT less than 0.3. Lookup tables with BT less than 0.3 have smaller spectral emissions that avoid exceeding the limit 140 without a reduction in overall transmission power. For example, a GMSK modulation filter with BT equaling 0.24 will produce a transmission with reduced spectral and spurious emissions that will not exceed the limit 140.

Figure 4:
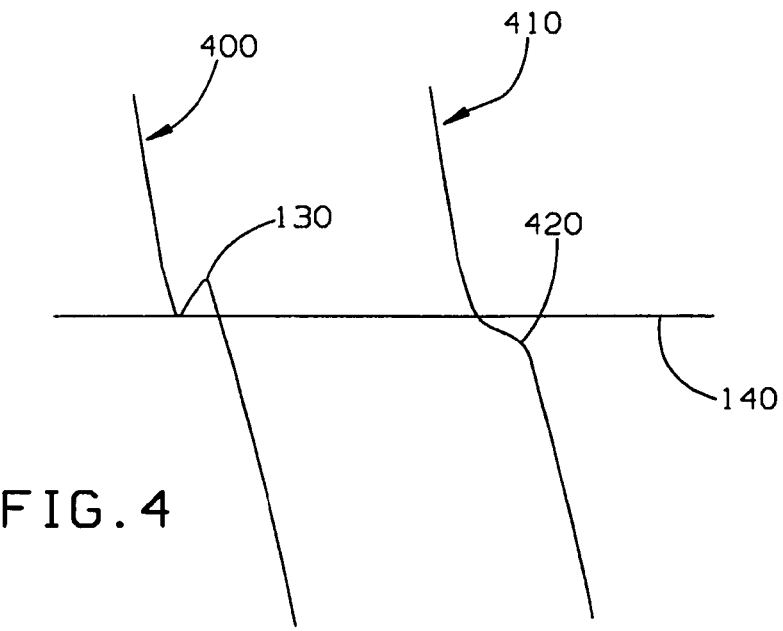
FIG. 4 is a representation of portions of the spectral masks for wireless communication transmissions modulated with different lookup tables.

To illustrate, representative portions of the spectral masks of transmissions modulated using an alternative lookup table 360 and the lookup table 370 for a GMSK modulator with BT equaling 0.3 are represented in FIG. 4. The spectral mask for the transmission 400 modulated with the lookup table 370 has spectral emissions with a spurious emission 130 that would exceed the limit 140 if transmitted at a channel on a block edge 120. The spectral mask for the transmission 410 modulated with an alternative lookup table 360 has lessened spectral emissions 420 such that the emissions do not exceed the limit 140.

Figure 5:
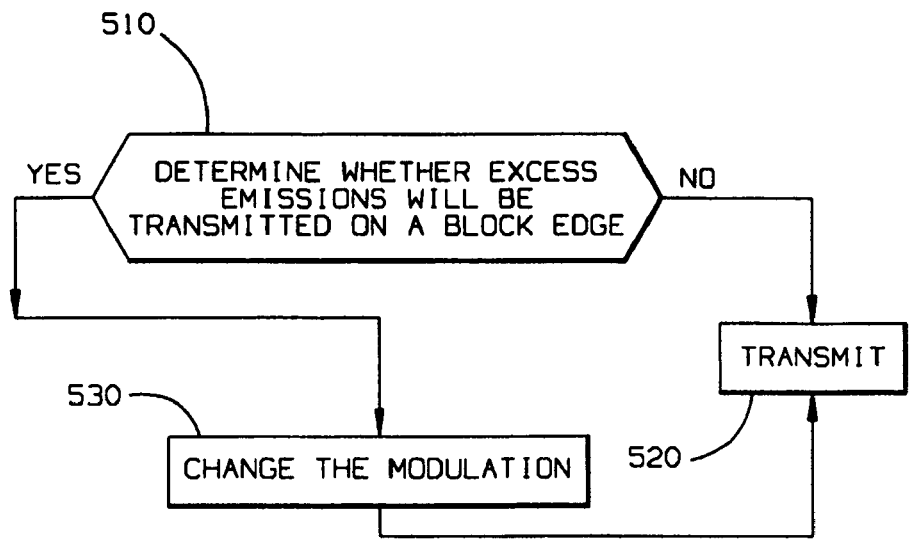
FIG. 5 is a flow diagram as configured in accordance with various embodiments of the invention.

A method of use according to various embodiments will be discussed with reference to FIG. 5. A block edge detector 310 determines 510 whether a wireless communication transmission with a first modulation having excess spectral emissions will be transmitted on a block edge 120. If excess spectral emissions will not be transmitted on a block edge 120, the signal will be transmitted 520 using the first modulation. If excess spectral emissions will be transmitted on a block edge 120, the modulator selector 320 will change 530 the modulation of the signal before transmitting 520 the signal through the transceiver 350.

Preferably, the second modulation will include a modulator 340 using an alternative lookup table 360. The preferred alternative lookup table 360 will include a table of phase trajectories where the lookup table entries likely to cause excess spectral emissions are smoothed to lessen the spectral emissions. The smoothing of these entries may be accomplished in a number of ways. In one embodiment, the entries may be smoothed, at least in part, by linear extrapolation. In another embodiment, the entries may be smoothed, at least in part, by non-linear extrapolation. In still another embodiment, the entries may be smoothed, at least in part, by filtering.

The block edge 120 may be defined in a number of ways. In the United States, the FCC defines a number of transmission channels as a block such that the frequency cutoffs for the block are the block edges 120. Similarly, the ETSI sets standards for frequency cutoffs that are block edges 120. A block edge 120 may alternatively be an operational limit such that spectral emissions above a certain level at the block edge 120 may be unacceptable. For example, excess spurious emissions for a transmission create problematic interference with transmissions on neighboring channels. Those skilled in the art will recognize further operational limits where spectral emissions are preferably reduced.

Figure 6:
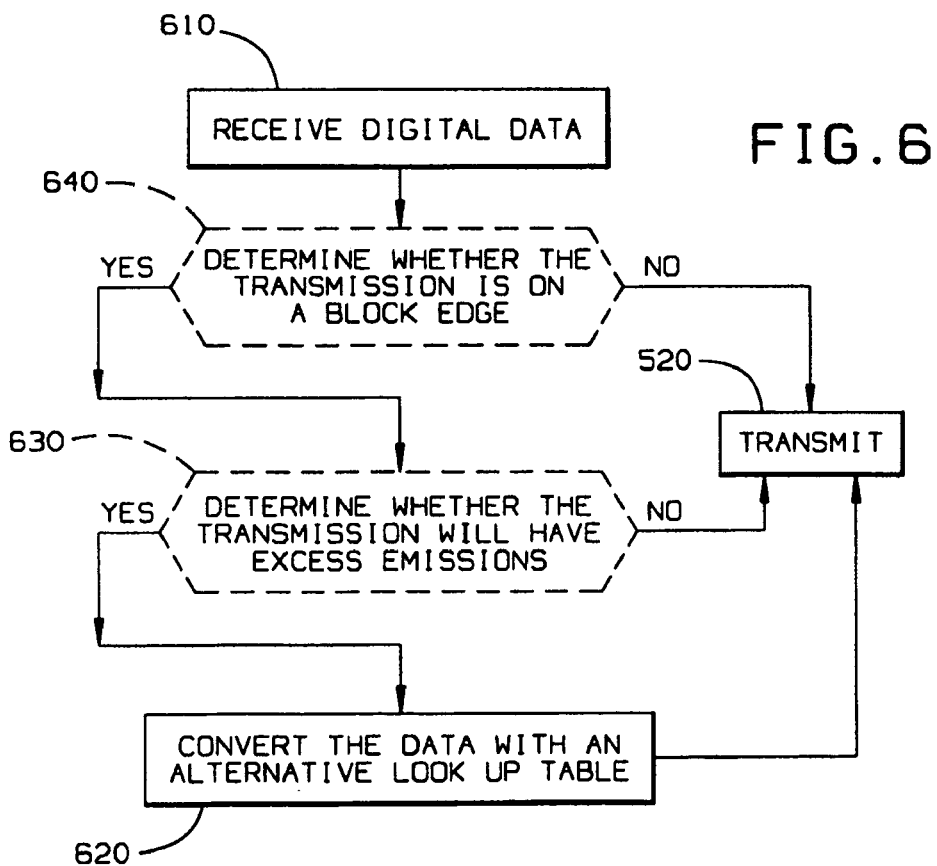
FIG. 6 is a flow diagram for the use of an alternative lookup table as configured in accordance with various embodiments of the invention.

An alternative method of operation is described with reference to FIG. 6. A wireless communication device 300 receives 610 digital data to be converted into a wireless communication transmission. One of skill in the art will recognize the data can be received from a variety of outside sources such as from a network like the Internet, or the data may be received locally such as from a memory or by encoding other data such as voice data. Then, the data is converted 620 into a wireless communication transmission using an alternative lookup table 360 that minimizes spectral emissions before transmitting 520 the signal. In one such embodiment, every transmission is modulated with the alternative lookup table 360. As such, every transmission will have lessened spectral emissions, and the wireless communication device 300 will not need another modulator 330 or lookup table 370.

As an alternative to having every transmission modulated with an alternative lookup table 360, the block edge detector 310 or other enabling structure can determine 630 whether the transmission will have excess spectral emissions. If so, the data will then be converted 620 using the alternative lookup table 360, but if the transmission will not have excess spectral emissions, the data will be otherwise modulated and transmitted 520. Optionally, the block edge detector 310 will determine 640 whether a transmission will be at a frequency on the block edge 120. If so, the data will be converted 620 with the alternative lookup table 360, or alternatively, the block edge detector 310 or other enabling structure will determine 630 whether the transmission will have excess spectral emissions. If so, then the modulator 340 will convert 620 the data using the alternative lookup table 360, and if not, then modulator 330 will convert the data prior to transmitting 520 the signal.

Figure 7:
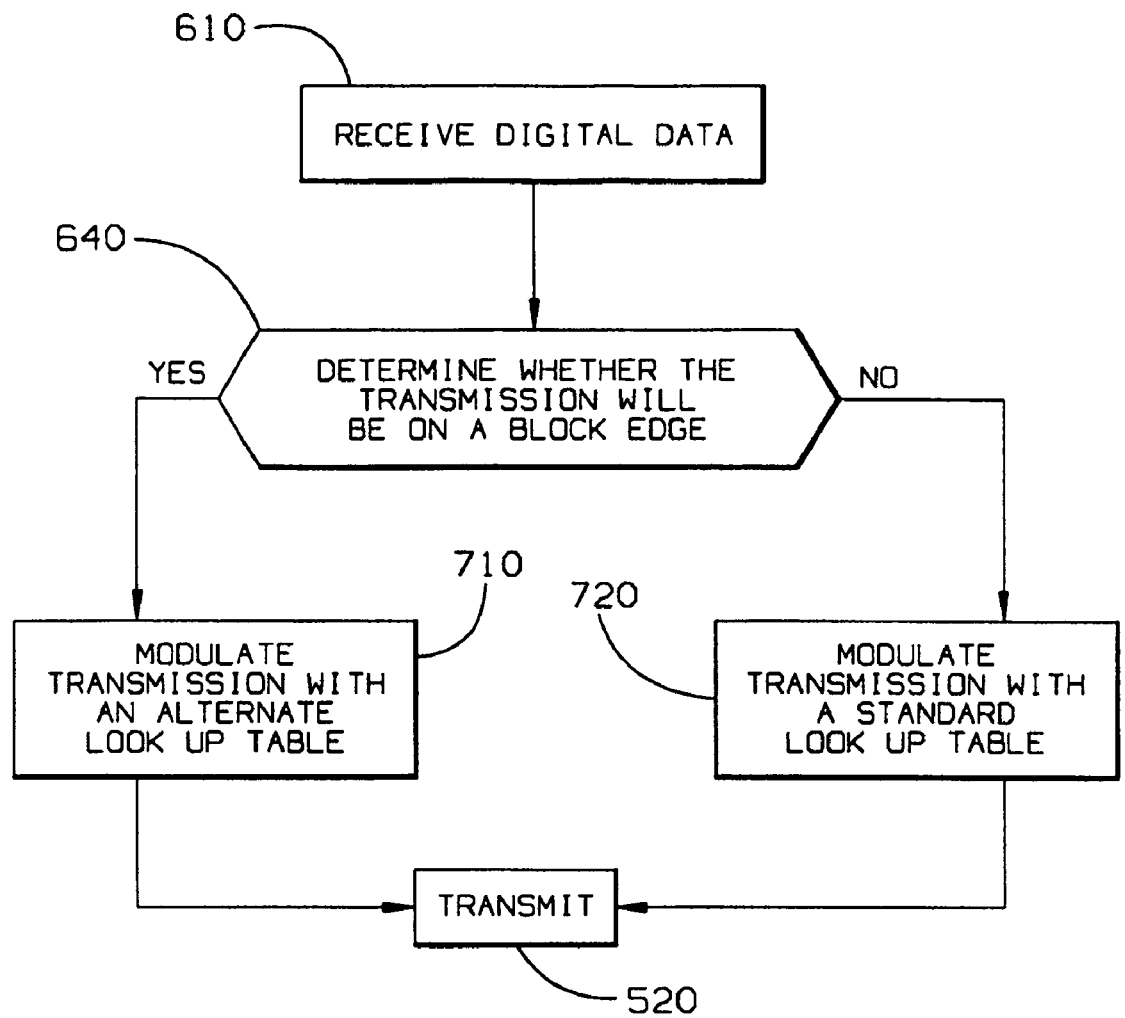
FIG. 7 is a flow diagram for the use of two lookup tables as configured in accordance with various embodiments of the invention.

Yet another embodiment will be described with reference to FIG. 7. First, the wireless communication device 300 receives 610 digital data to be transmitted. Next, the block edge detector 310 determines 640 whether the transmission will be on a block edge 120. If the transmission will be on a block edge 120, modulator 340 will modulate 710 the transmission with an alternative lookup table 360, whereas if the transmission will not be on a block edge 120, modulator 330 will modulate 720 the transmission with a standard lookup table 370. In this case, no determination is made as to whether the spectral emissions will violate a given limit 140. This embodiment is preferred in systems where the standard modulation is known to violate a given limit 140 on a block edge 120.

So configured, a wireless communication device operating in accordance with the various embodiments will reduce the spectral, including spurious, emissions of the spectral mask of certain transmissions. This reduction will allow certain transmissions to take place without reducing the overall power of the transmission. Further, the modulation changes may be made selectively or for every transmission.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   determining whether a wireless communication transmission with a first modulation having excess spectral emissions will be transmitted at a frequency on a block edge;
   changing the wireless communication transmission to a second modulation with lessened spectral emissions in response to determining that the wireless communication transmission with the first modulation having excess spectral emissions will be transmitted at a frequency on a block edge.

2. The method of claim 1 wherein changing the wireless communication transmission to a second modulation with lessened spectral emissions in response to determining that the wireless communication transmission with the first modulation having excess spectral emissions will be transmitted at a frequency on a block edge further comprises using an alternative lookup table for the wireless communication transmission.

3. The method of claim 2 wherein the alternative lookup table comprises a table of phase trajectories where lookup table entries likely to cause spectral emissions are smoothed to lessen spectral emissions.

4. The method of claim 3 wherein the lookup table entries likely to cause spectral emissions are smoothed, at least in part, by linear extrapolation.

5. The method of claim 3 wherein the lookup table entries likely to cause spectral emissions are smoothed, at least in part, by non-linear extrapolation.

6. The method of claim 3 wherein the lookup table entries likely to cause spectral emissions are smoothed, at least in part, by filtering.

7. The method of claim 1 wherein the first modulation comprises Gaussian Minimum Shift Keying where BT=0.3 and the second modulation comprises Gaussian Minimum Shift Keying where BT is less than 0.3.

8. The method of claim 1 wherein the first modulation comprises Gaussian Minimum Shift Keying where BT=0.3 and the second modulation comprises Gaussian Minimum Shift Keying where BT=0.24.

9. The method of claim 7 wherein the block edge is defined, at least in part, by an operational limit.

10. A method comprising:
    receiving digital data to be converted into a wireless communication transmission;
    converting the digital data into the wireless communication transmission using an alternative lookup table that minimizes excess spectral emissions, wherein the alternative lookup table comprises a table of phase trajectories where lookup table entries likely to cause excess spectral emissions are smoothed to lessen spectral emissions.

11. The method of claim 10 wherein the lookup table entries likely to cause spectral emissions are smoothed, at least in part, by linear extrapolation.

12. The method of claim 10 wherein the lookup table entries likely to cause spectral emissions are smoothed, at least in part, by non-linear extrapolation.

13. The method of claim 10 wherein the lookup table entries likely to cause excess spectral emissions are smoothed, at least in part, by filtering.

14. A method comprising:
    receiving digital data to be converted into a wireless communication transmission;
    converting the digital data into the wireless communication transmission using an alternative lookup table that minimizes excess spectral emissions;
    wherein the step of converting the digital data into the wireless communication transmission using an alternative lookup table that minimizes excess spectral emissions occurs only after determining that the wireless communication transmission will be transmitted with excess spectral emissions, and wherein determining that the wireless communication transmission will be transmitted with excess spectral emissions further comprises determining that the wireless communication transmission will be transmitted using a frequency on a block edge.

15. The method of claim 14 wherein the block edge is defined, at least in part, an operational limit.

16. An apparatus comprising:
    a wireless communication transceiver;
    a block edge detector;
    a first modulator selectively coupled to the wireless communication transceiver;
    a second modulator selectively coupled to the wireless communication transceiver;
    an alternative lookup table operably coupled to the second modulator;
    a modulator selector being responsive to the block edge detector and having a selector output operably coupled to the first modulator and the second modulator.

17. The apparatus of claim 16 wherein the alternative lookup table further comprises a table of phase trajectories where lookup table entries likely to cause an excess spectral emission are smoothed to lessen the excess spectral emission.

18. The apparatus of claim 16 wherein the alternative lookup table further comprises a lookup table for Gaussian Minimum Shift Keying where BT is less than 0.3 and the first modulator is operably coupled to a lookup table for Gaussian Minimum Shift Keying where BT=0.3.

* * * * *